US012726806B2

(12) United States Patent
Li et al.

(10) Patent No.: US 12,726,806 B2
(45) Date of Patent: Sep. 1, 2026

(54) PRESERVED RESOURCE BASED SOS MESSAGE RELAY USING ATG CONNECTIONS

(71) Applicant: QUALCOMM Incorporated, San Diego, CA (US)

(72) Inventors: Qiaoyu Li, Beijing (CN); Alexei Yurievitch Gorokhov, San Diego, CA (US); Kangqi Liu, San Diego, CA (US); Hao Xu, Beijing (CN); Chao Wei, Beijing (CN); Peter Gaal, San Diego, CA (US); Tingfang Ji, San Diego, CA (US); Qiang Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 18/681,486

(22) PCT Filed: Sep. 8, 2021

(86) PCT No.: PCT/CN2021/117115
§ 371 (c)(1),
(2) Date: Feb. 5, 2024

(87) PCT Pub. No.: WO2023/035134
PCT Pub. Date: Mar. 16, 2023

(65) Prior Publication Data
US 2025/0133382 A1 Apr. 24, 2025

(51) Int. Cl.
*H04W 4/90* (2018.01)
*H04W 4/12* (2009.01)
(Continued)

(52) U.S. Cl.
CPC ............... *H04W 4/90* (2018.02); *H04W 4/12* (2013.01); *H04W 28/26* (2013.01); *H04W 56/0015* (2013.01); *H04W 84/06* (2013.01)

(58) Field of Classification Search
CPC ........... H04W 4/90; H04W 4/12; H04W 4/40; H04W 28/26; H04W 56/0015;
(Continued)

(56) References Cited

U.S. PATENT DOCUMENTS

2008/0117858 A1 5/2008 Kauffman
2013/0242847 A1* 9/2013 Oh ......................... H04H 20/59
370/312
(Continued)

FOREIGN PATENT DOCUMENTS

CN 112153556 A 12/2020

OTHER PUBLICATIONS

Masoo et al., "Surveying pervasive public safety communication technologies in the context of terrorist attacks", Apr. 29, 2020,pp. 1-29 (Year: 2020).*
(Continued)

*Primary Examiner* — Farid Seyedvosoghi
(74) *Attorney, Agent, or Firm* — Procopio, Cory, Hargreaves & Savitch LLP

(57) ABSTRACT

A UE may identify a first set of preserved resources of one or more sets of preserved resources. An aircraft-borne device may identify a first set of preserved resources of one or more sets of preserved resources. The first set of preserved resources may be associated with a time domain starting point, a time domain duration, and a frequency domain resource allocation. The UE may transmit, to an aircraft-borne device and the aircraft-borne device may, receive from the UE, over at least part of the first set of preserved resources, a synchronization signal and a first payload
(Continued)

message. The first payload message may include a first emergency message and may be transmitted and received via one of a first PUSCH, a first PSSCH, or a PSCCH. The aircraft-borne device may forward, to a base station or another aircraft-borne device, at least the first emergency message.

30 Claims, 12 Drawing Sheets

(51) Int. Cl.

| | |
|---|---|
| ***H04W 28/26*** | (2009.01) |
| ***H04W 56/00*** | (2009.01) |
| *H04W 84/06* | (2009.01) |

(58) Field of Classification Search
CPC ..... H04W 84/06; H04W 76/14; H04W 76/50; H04B 7/18506
See application file for complete search history.

(56) References Cited

U.S. PATENT DOCUMENTS

| | | | | |
|---|---|---|---|---|
| 2020/0295820 | A1 | 9/2020 | Yasunaga et al. | |
| 2021/0204306 | A1 | 7/2021 | Li et al. | |
| 2022/0110148 | A1* | 4/2022 | Oh | H04W 72/23 |
| 2022/0264653 | A1* | 8/2022 | Xiong | H04W 74/0833 |
| 2023/0006772 | A1* | 1/2023 | Yoshioka | H04W 72/23 |
| 2024/0031934 | A1* | 1/2024 | Si | G01S 5/0205 |

OTHER PUBLICATIONS

CMCC: "New WID on Air-To-Ground Network for NR", R4-2014353, 3GPP TSG-RAN WG4 Meeting #97-e, Electronic Meeting, Nov. 2-13, 2020, Section 3, 5 Pages.

Ericsson: "Signalling to Support UE-NW Relay and Service Continuity", Tdoc-R2-151148, 3GPP TSG-RAN WG2 #89 bis, Bratislava, Slovakia, Apr. 20-24, 2015, the whole document, pp. 1-7.

International Search Report and Written Opinion—PCT/CN2021/117115—ISA/CN—Apr. 24, 2022.

Xiaomi: "Consideration on TA Compensation for HAPS and ATG Case", R2-2008998, 3GPP TSG-RAN2 #112e, Online, Nov. 2-13, 2020, Section 2, pp. 1-3.

3GPP TR 38.821: "3rd Generation Partnership Project, Technical Specification Group Radio Access Network, Solutions for NR to Support Non-terrestrial Networks (NTN) (Release 16)", 3GPP Standard, Technical Report, 3rd Generation Partnership Project, Mobile Competence Centre, 650, Route Des Lucioles, F-06921 Sophia-Antipolis Cedex, France, vol. RAN WG3, No. V1.0.0, Dec. 2, 2019, pp. 1-143, XP051840691.

Masood A., et al., "Surveying Pervasive Public Safety Communication Technologies in the Context of Terrorist Attacks", Physical Communication, Elsevier, amsterdam, NL, vol. 41, Apr. 29, 2020, pp. 1-29, XP086179485, sections 2-5, figures 1-9.

Supplementary European Search Report—EP21956323—Search Authority—The Hague—Apr. 9, 2025.

* cited by examiner

One Frame (TDD)
10 ms
subframe
slot
RB
200
OFDM symbol
subcarrier
DMRS R
CSI-RS
230
PDCCH CORESET
SSS
PSS
PDSCH
PBCH
REG 12 REs
1 CCE = 6 REGs
SS/PBCH Block
BWP
20 RBs
channel bandwidth RBs
250
SRS Comb 0
SRS Comb 1
SRS
280
PUCCH
PUSCH

1000

1002: identify a first set of preserved resources of one or more sets of preserved resources 1004: receive, from one or more satellites, one or more satellite signals 1006: locate the time domain starting point associated with the first set of preserved resources based on the one or more satellite signals 1008: receive, from a UE and over at least part of the first set of preserved resources, a synchronization signal and a first payload message, the first payload message including a first emergency message and being received via one of a first PUSCH, a first PSSCH, or a PSCCH 1010: receive, from the UE and over at least part of the first set of preserved resources, a second payload message via one of a second PUSCH or a second PSSCH 1012: forward, to a base station or another aircraft-borne device, at least the first emergency message

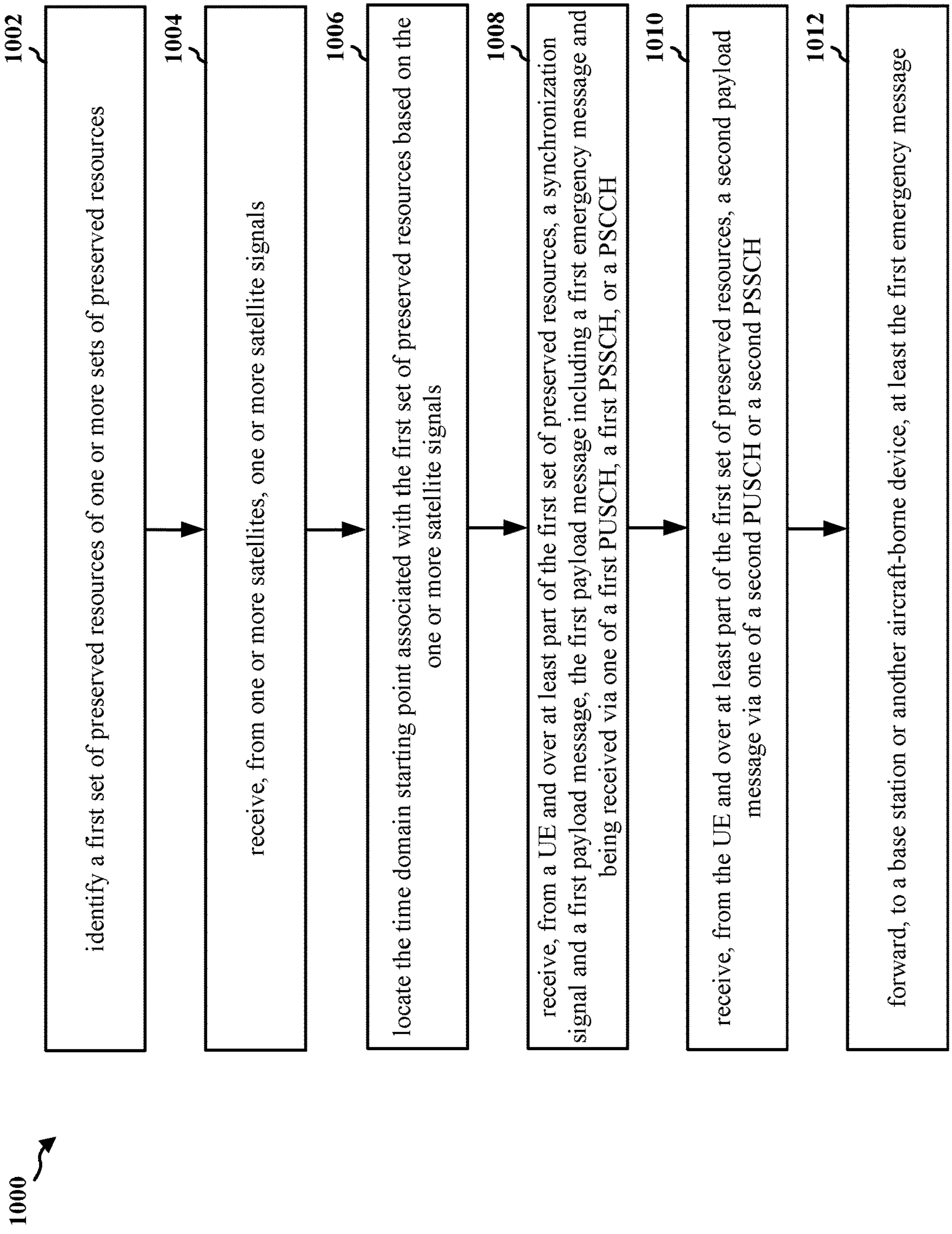

FIG. 10

PRESERVED RESOURCE BASED SOS MESSAGE RELAY USING ATG CONNECTIONS

CROSS-REFERENCE TO RELATED APPLICATIONS

This application is a National Stage Application filed under 35 U.S.C. § 371 of PCT International Application Serial No. PCT/CN2021/117115 entitled "PRESERVED RESOURCE BASED SOS MESSAGE RELAY USING ATG CONNECTIONS," and filed on Sep. 8, 2021, which is expressly incorporated by reference herein in its entirety.

TECHNICAL FIELD

The present disclosure relates generally to communication systems, and more particularly, to relaying of emergency messages via an air-to-ground (ATG) wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type e communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may identify a first set of preserved resources of one or more sets of preserved resources. The apparatus may transmit, to an aircraft-borne device and over at least part of the first set of preserved resources, a synchronization signal and a first payload message. The first payload message may include a first emergency message and may be transmitted via one of a first physical uplink shared channel (PUSCH), a first physical sidelink shared channel (PSSCH), or a physical sidelink control channel (PSCCH).

In an aspect of the disclosure, a method, a computer-readable medium, and an apparatus are provided. The apparatus may be an airborne-device. The apparatus may identify a first set of preserved resources of one or more sets of preserved resources. The apparatus may receive, from a UE and over at least part of the first set of preserved resources, a synchronization signal and a first payload message. The first payload message may include a first emergency message and may be received via one of a first PUSCH, a first PSSCH, or a PSCCH. The apparatus may forward, to a base station or another aircraft-borne device, at least the first emergency message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 10 is a flowchart of a method of wireless communication.

DETAILED DESCRIPTION

Figure 1:
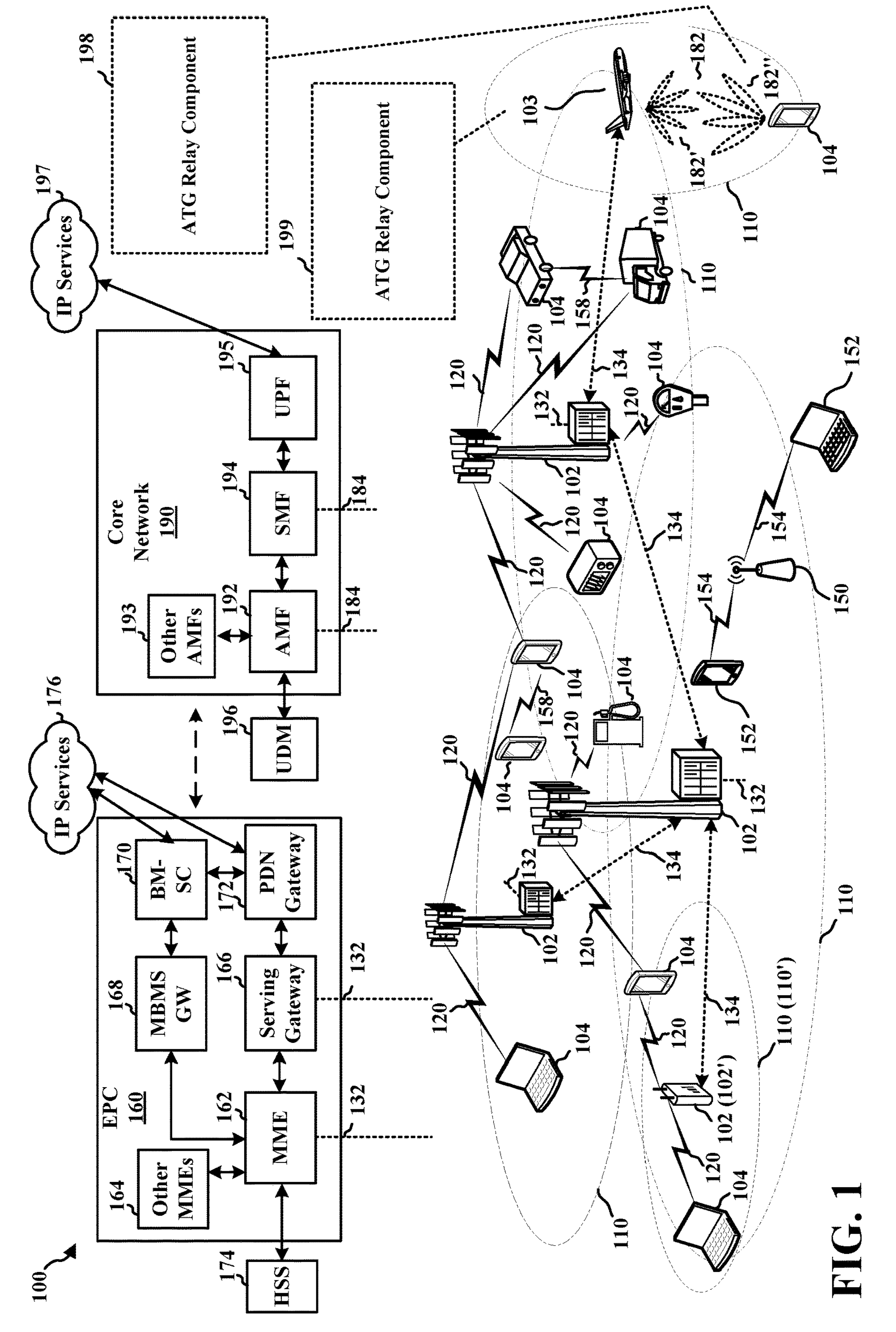
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN)

sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, cNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an ATG relay component 198 that may be configured to identify a first set of preserved resources of one or more sets of preserved resources. The ATG relay component 198 may be configured to transmit, to an aircraft-borne device and over at least part of the first set of preserved resources, a synchronization signal and a first payload message. The first payload message may include a first emergency message and may be transmitted via one of a first PUSCH, a first PSSCH, or a PSCCH. In certain aspects, the aircraft-borne device 103 may include an ATG relay component 199 that may be configured to identify a first set of preserved resources of one or more sets of preserved resources. The ATG relay component 199 may be configured to receive, from a UE and over at least part of the first set of preserved resources, a synchronization signal and a first payload message. The first payload message may include a first emergency message and may be received via one of a first PUSCH, a first PSSCH, or a PSCCH. The ATG relay component 199 may be configured to forward, to a base station or another aircraft-borne device, at least the first emergency message. Although the following description may be focused on 5G NR, the concepts described herein may be applicable to other similar areas, such as LTE, LTE-A, CDMA, GSM, and other wireless technologies.

Figure 2B:
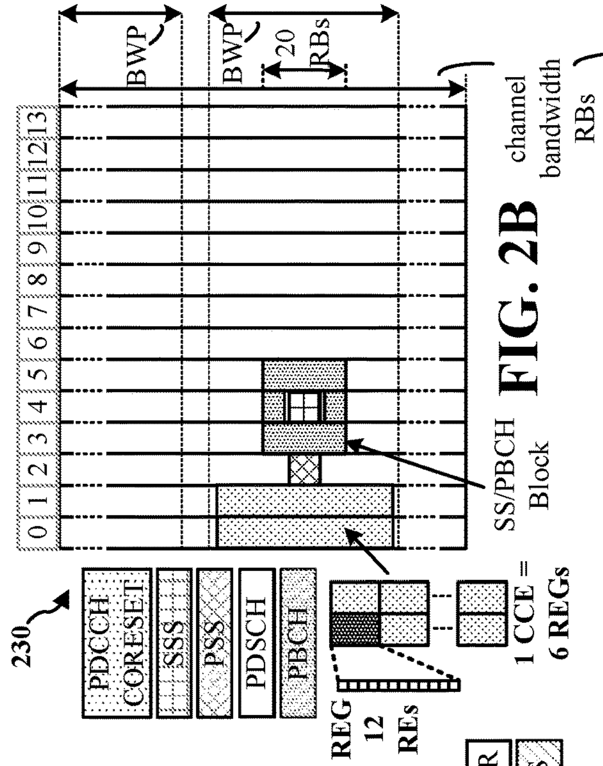
FIG. 2B is a diagram illustrating an example of DL channels within a subframe, in accordance with various aspects of the present disclosure.
Figure 2D:
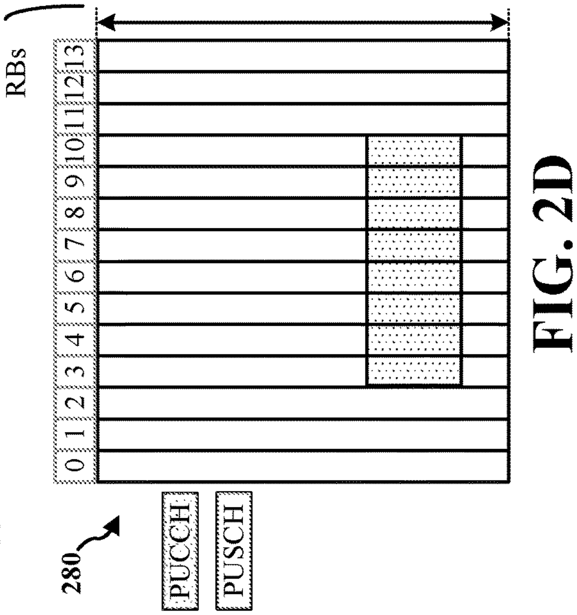
FIG. 2D is a diagram illustrating an example of UL channels within a subframe, in accordance with various aspects of the present disclosure.
Figure 2A:
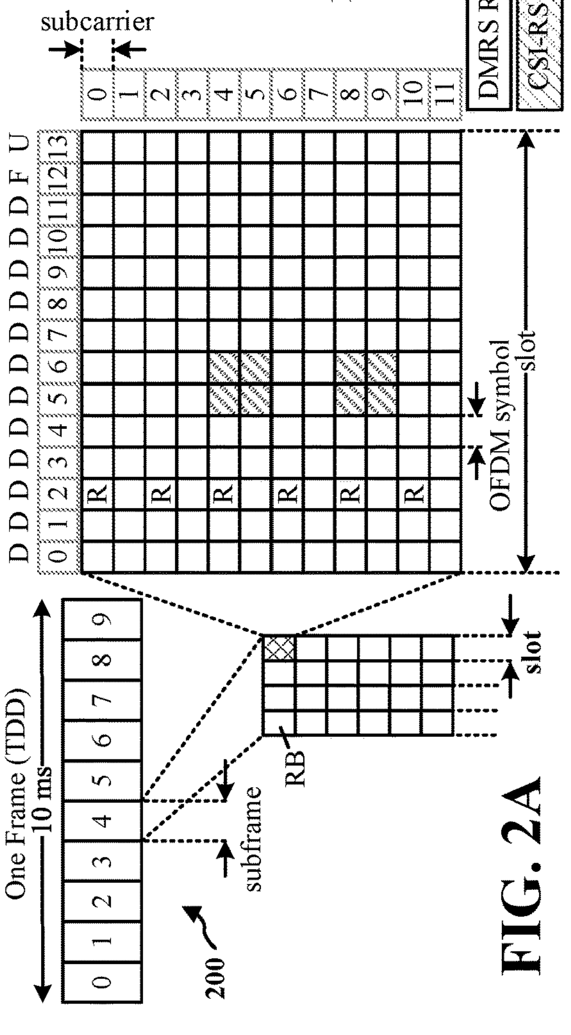
FIG. 2A is a diagram illustrating an example of a first frame, in accordance with various aspects of the present disclosure.
Figure 2C:
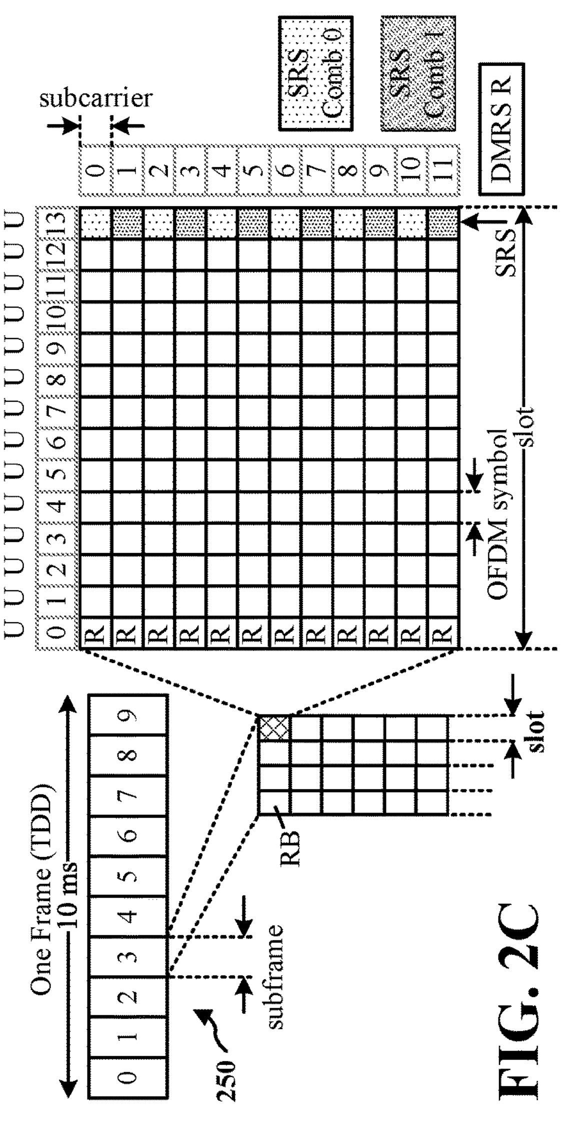
FIG. 2C is a diagram illustrating an example of a second frame, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
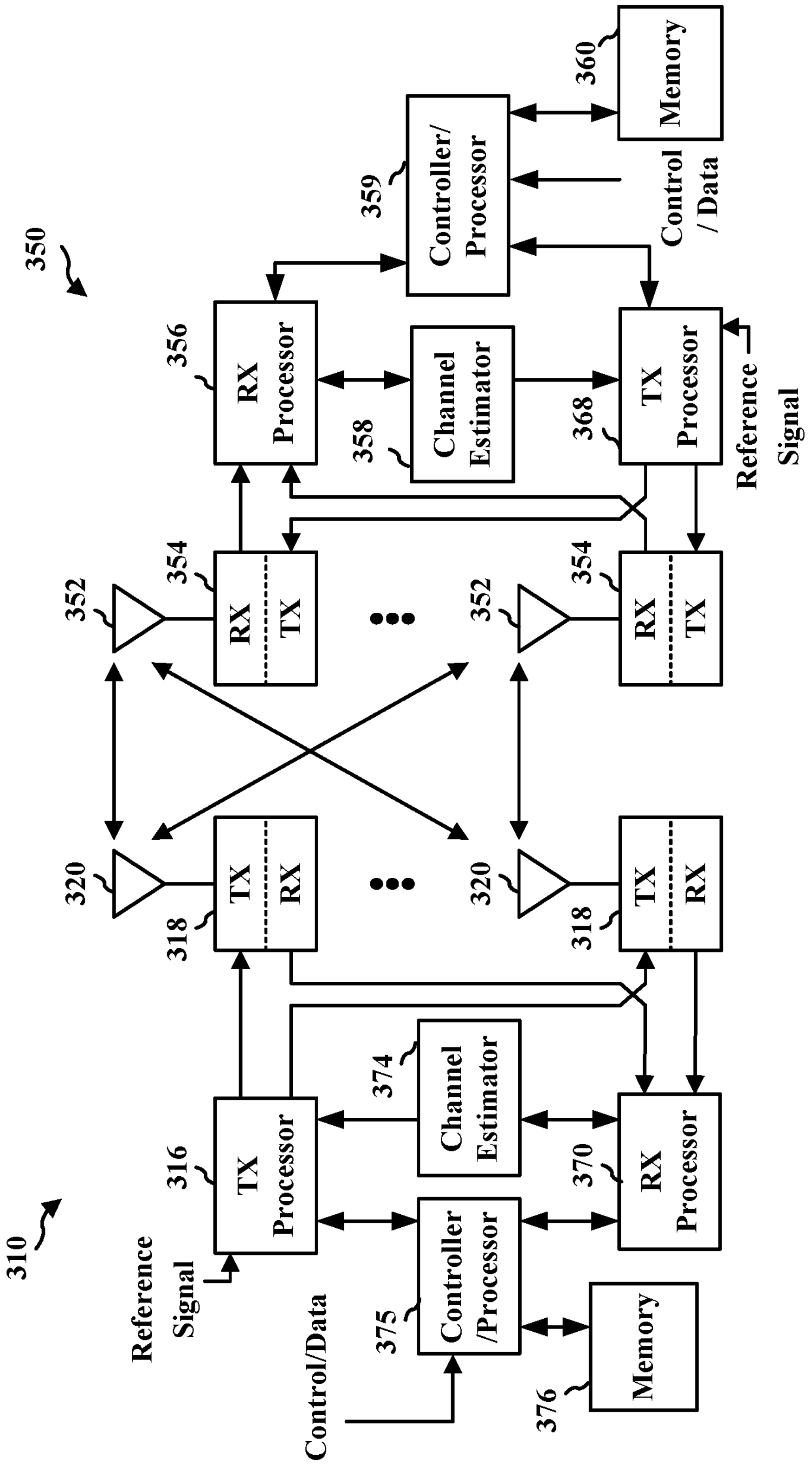
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

To enable the transmission of an emergency message (e.g., an SOS message) from a mobile device (e.g., a mobile UE) at a location where there is no terrestrial cellular coverage, a number of approaches may be utilized. In one approach, the emergency message may be transmitted and delivered via a satellite communication (SatCom) system such as the Iridium system or another similar system. This approach may leverage the existing satellites that are already in operation, and may be associated with a low time to market and low deployment costs. However, this approach may also be associated with strict antenna and TX power specifications. The operations may be human-assisted, where a skilled human may point the antenna toward the satellite to avoid blockage. Further, the approach may not be applicable to modern mobile devices with smaller form factors. In addition, machine type communications (MTC)-like messages may not be transmitted via such a SatCom system.

In another approach, the emergency message may be transmitted and delivered via a satellite-based 3GPP non-terrestrial network (NTN). A 3GPP NTN may not be associated with the drawbacks associated with the SatCom system as described above. However, 3GPP NTNs may be associated with high deployment costs because new satellites are to be launched and new gateways are to be installed.

Figure 4A:
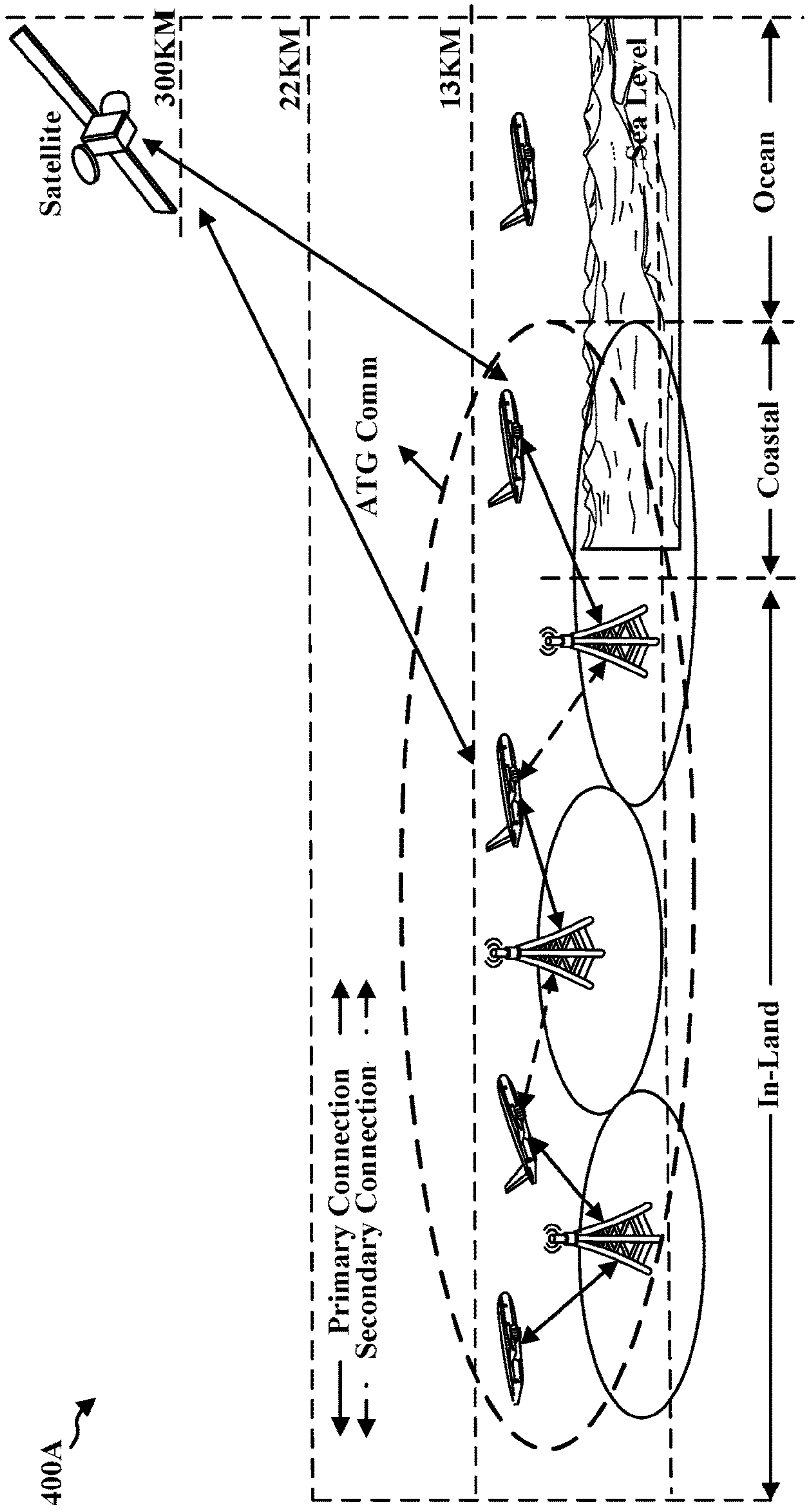
FIG. 4A is a diagram illustrating wireless communications in NTNs, and in particular, ATG communications.

FIG. 4A is a diagram 400A illustrating wireless communications in NTNs, and in particular, ATG communications. ATG communications may take place between aircraft-borne devices in the air and ground-based base stations when the aircraft are in an in-land or coastal area. The ground-based base stations may be equipped with up-tilting antennas for communication with aircraft-borne devices in the air, and the aircraft-borne devices may be equipped with antennas at the bottom or on the sides of the aircraft for communication with ground-based base stations. Compared to satellite-based communications (e.g., via an Iridium-like SatCom system or a satellite-based 3GPP NTN, which, for example, may be used when the aircraft is above an ocean), ATG communications may be associated with a lower cost, a higher throughput, and/or a lower latency. The data traffic that may be carried over ATG communications may include aircraft passenger communications (e.g., communications associated with the passengers' own devices, which may be available en route on commercial flights, and additionally during takeoff, landing, climb and/or descent for business aviation), airline operation communications (e.g., aircraft maintenance information, flight planning information, weather information, etc.), and/or air traffic control communications (e.g., the ATG communications may serve as a backup to systems operating in aviation licensed bands). Standardization of the ATG communications may enable globally inter-operable deployments of ATG communication systems.

Figure 4B:
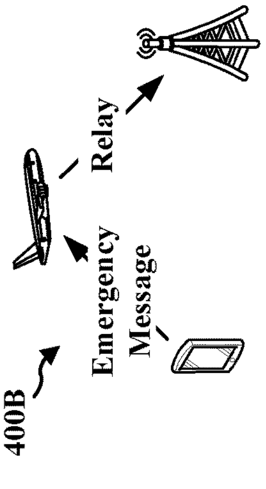
FIG. 4B is a diagram illustrating the relaying of an emergency message by an aircraft-borne device.

FIG. 4B is a diagram 400B illustrating the relaying of an emergency message by an aircraft-borne device. The aircraft may be a commercial aircraft in flight. The UE may transmit the emergency message to the aircraft-borne device. The aircraft-borne device may forward the emergency message to a ground-based base station. In one aspect, the emergency message may be relayed via one or more additional aircraft-borne devices installed on additional aircraft in flight before being transmitted down to the ground-based base station. Accordingly, (commercial) aircraft may be used as relays to extend the coverage of the emergency message service to areas without terrestrial base stations. The typical cruising altitude (e.g., 10 km) of an aircraft may allow for line-of-sight signal propagation from as far as over 200 km. The density of (commercial) aircraft overhead may vary from region to region, and may be higher during daytime. For example, at least one aircraft may be visible within the 50-100 km range in most of the remote areas in the U.S.

Compared to satellite-based 3GPP NTNs, an ATG communication system may be implemented without launching satellites. Accordingly, the ATG communication system may be associated with a lower deployment cost and a faster time to market. Compared to Iridium-like SatCom systems, less human assistance may be involved in operating the mobile device when an emergency message is sent. Further, MTC-like message may be supported via the ATG communication system.

Aspects of the disclosure may relate to ATG communication based relaying of emergency messages. In one or more aspects, an aircraft-borne device may not actively broadcast signals to enable mobile UEs to discover the aircraft-borne device. Accordingly, interference to terrestrial systems caused by the ATG communication system may be avoided. Rather, preserved resources for emergency messages may be utilized for the transmission and reception of the emergency messages between the UE and the aircraft-borne device.

Figure 5A:
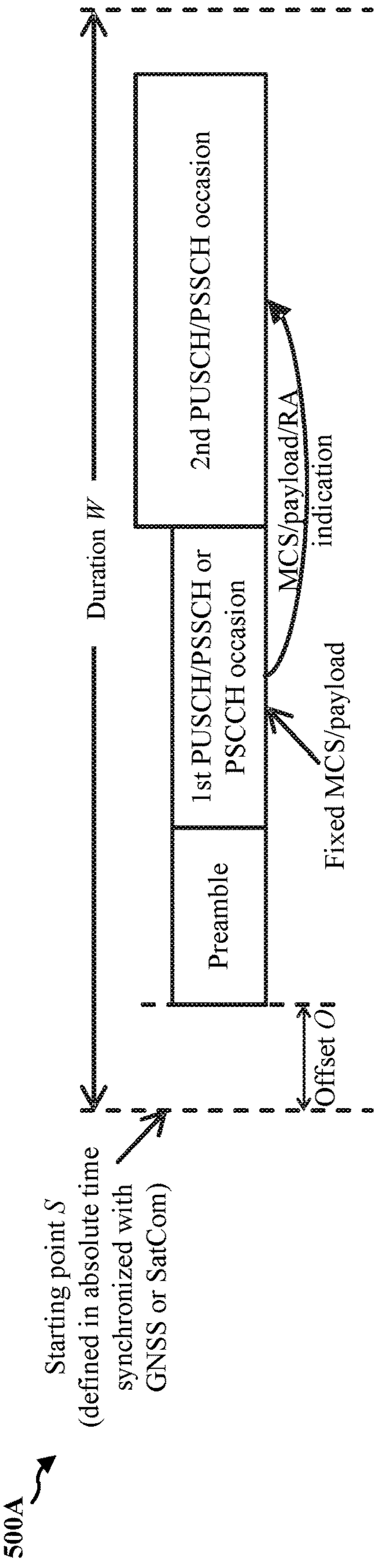
FIG. 5A is a diagram illustrating preserved resources from the perspective of a UE.

FIG. 5A is a diagram 500A illustrating preserved resources from the perspective of a UE. The terrestrial UE may identify preserved resources (which may be sidelink resources if the aircraft-borne device operates as a UE, or may be uplink resources if the aircraft-borne device operates as a base station or a customer-premises equipment (CPE)). The preserved resources may be associated with at least a starting point in the time domain S, a time domain duration W, and a frequency domain resource allocation. The UE may use the preserved resources to transmit at least one of a preamble (or a DM-RS) or a PUSCH (or a PSSCH or a PSCCH, as appropriate). In one configuration, the preserved resources may be prespecified. In another configuration, the UE and/or the aircraft-bone device may receive the configuration information of the preserved resources from a SatCom system.

In one configuration, the starting point of the preserved resources in the time domain (i.e., S) may be specified with respect to an absolute time. In one configuration, the UE and the aircraft-borne device may synchronize their clocks based on the absolute time obtained from a global navigation satellite system (GNSS) (e.g., the global positioning system (GPS)) or a SatCom system. The UE may receive the appropriate signals from one or more satellites of a GNSS or a SatCom system, and may obtain the absolute time that is synchronized with that of the GNSS or the SatCom system. Based on the obtained absolute time, the UE may locate the starting point of the preserved resources in the time domain (i.e., S).

In one aspect, the UE may transmit, to the aircraft-borne device via at least part of the preserved resources, at least a preamble sequence (or a DM-RS) followed by a PUSCH (or a PSSCH or a PSCCH, as appropriate) carrying an emergency message. The UE may transmit the preamble (or a DM-RS) upon the passing of an offset O after the starting point of the preserved resources in the time domain (i.e., S), or may transmit the preamble at S (i.e., offset O=0). In one configuration, the offset O may be prespecified. In another configuration, the UE may receive an indication of the offset O from a SatCom system.

In one configuration, the time domain window of the preserved resources may include two separate PUSCH (or PSSCH or PSCCH, as appropriate) occasions. The first PUSCH (or PSSCH or PSCCH, as appropriate) occasion may be associated with a prespecified modulation and coding scheme (MCS), a prespecified payload size, and a prespecified resource allocation. The payload transmitted at the first PUSCH (or PSSCH or PSCCH, as appropriate) occasion may include one or more indications of the payload size, the MCS, and/or the resource allocation associated with the second PUSCH (or PSSCH or PSCCH, as appropriate) occasion.

In one configuration, instead of the first PSSCH, the UE may transmit a first PSCCH. In one configuration, the UE may transmit, via at least part of the preserved resources, one or more repetitions of the preamble (or the DM-RS) and/or the PUSCH (or the PSSCH or the PSCCH, as appropriate). In one configuration, the UE may transmit, via at least part of the preserved resources, a combination of preambles and/or DM-RSs for the PUSCH (or the PSSCH or the PSCCH, as appropriate). Any suitable combination of preambles and/or DM-RSs may be chosen and utilized.

Figure 5B:
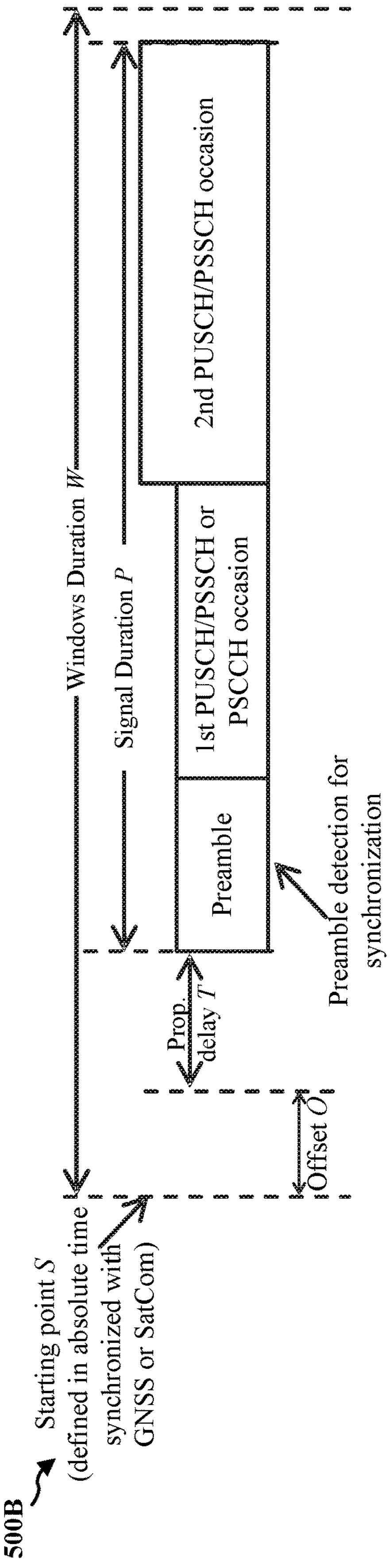
FIG. 5B is a diagram illustrating preserved resources from the perspective of an aircraft-borne device.

FIG. 5B is a diagram 500B illustrating preserved resources from the perspective of an aircraft-borne device. In different configurations, the aircraft-borne device may self-identify as a UE, or as a base station. If the aircraft-borne device self-identifies as a UE, the preserved resources may be sidelink resources, and the UE may transmit, to the aircraft-borne device, one or more PSSCHs or PSCCHs. If the aircraft-borne device self-identifies as a base station, the preserved resources may be uplink resources, and the UE may transmit, to the aircraft-borne device, one or more PUSCHs.

The aircraft-borne device may identify the preserved resources. The preserved resources may be associated with at least a starting point in the time domain S, a time domain duration W, and a frequency domain resource allocation. The aircraft-borne device may use the preserved resources to receive at least one of a preamble (or a DM-RS) or a PUSCH (or a PSSCH or a PSCCH, as appropriate). In one configuration, the preserved resources may be prespecified. In another configuration, the UE and/or the aircraft-bone device may receive the configuration information of the preserved resources from a SatCom system.

In one configuration, the starting point of the preserved resources in the time domain (i.e., S) may be specified with respect to an absolute time. In one configuration, the UE and the aircraft-borne device may synchronize their clocks based on the absolute time obtained from a GNSS or a SatCom system. The aircraft-borne device may receive the appropriate signals from one or more satellites of a GNSS or a SatCom system, and may obtain the absolute time that is synchronized with that of the GNSS or the SatCom system. Based on the obtained absolute time, the aircraft-borne device may locate the starting point of the preserved resources in the time domain (i.e., S).

The aircraft-borne device may detect the signals transmitted by the UE within the time domain window duration (i.e., W). In particular, the aircraft-borne device may detect the preamble (or the DM-RS) after the time domain starting point of the preserved resources (i.e., S).

The time domain duration W may be sufficiently long to accommodate the payload size of the emergency message. In other words, for a large payload size, a longer duration W may be utilized. Further, the time domain duration W may be ≥max (O)+T+P, where max (O) may be the maximum of the offset O, T may be the maximum of the target time domain propagation delay, and P may be the maximum allowed total time domain duration of the overall transmitted signals.

Multiple sets of preserved resources may be predefined or indicated. Each set of preserved resources may be associated with at least one of a payload size, a maximum target propagation delay T, a UE transmission capability, an emergency message priority, or a status of UE awareness of the aircraft location. In particular, in one aspect, a smaller payload size may be associated with a single part PUSCH (or PSSCH or PSCCH, as appropriate), whereas a larger payload size may be associated with a 2-part PUSCH (or PSSCH or PSCCH, as appropriate). In another aspect, when a longer propagation delay is expected and planned for (assuming the payload size is the same), the preserved resources may be associated with a greater time domain window duration W.

In one aspect, the transmission capability of the UE may be based on one or more of a TX power, a number of TX antennas (or antenna elements), and/or a TX gain. When the UE is associated with a higher transmission capability, the preserved resources may accommodate fewer repetitions of the preamble (or the DM-RS) and/or the PUSCH (or the PSSCH or the PSCCH, as appropriate), and the number of preamble/DM-RS choices may be greater/smaller compared to when the UE is associated with a lower transmission capability (e.g., there may be multiple preambles/DM-RSs associated with one preserved resource, similar to contention based random access).

In one aspect, preserved resources for an emergency message associated with a higher priority (e.g., man down, a severe traffic accident, etc.) may accommodate a greater number of preamble/DM-RS choices compared to when the emergency message is associated with a lower priority (e.g., a loss of direction, a flat tire, etc.).

In one aspect, the terrestrial UE may be aware of the location of the aircraft (e.g., through the automatic dependent surveillance-broadcast (ADS-B) technology). Further, the UE may perform autonomous pre-compensation for the timing advance based on the location of the UE (which may be obtained using a GNSS receiver) and the location of the aircraft. In such a case, the preserved resources may be associated with a shorter window duration W (than when the UE has no knowledge about the location of the aircraft).

In one aspect, the emergency messages may include, in the payload, at least one of longitude and latitude coordinates (e.g., GNSS/GPS coordinates), a time stamp, an identifier of the UE, a personal identifier, an emergency type, or an emergency level.

Figure 6:
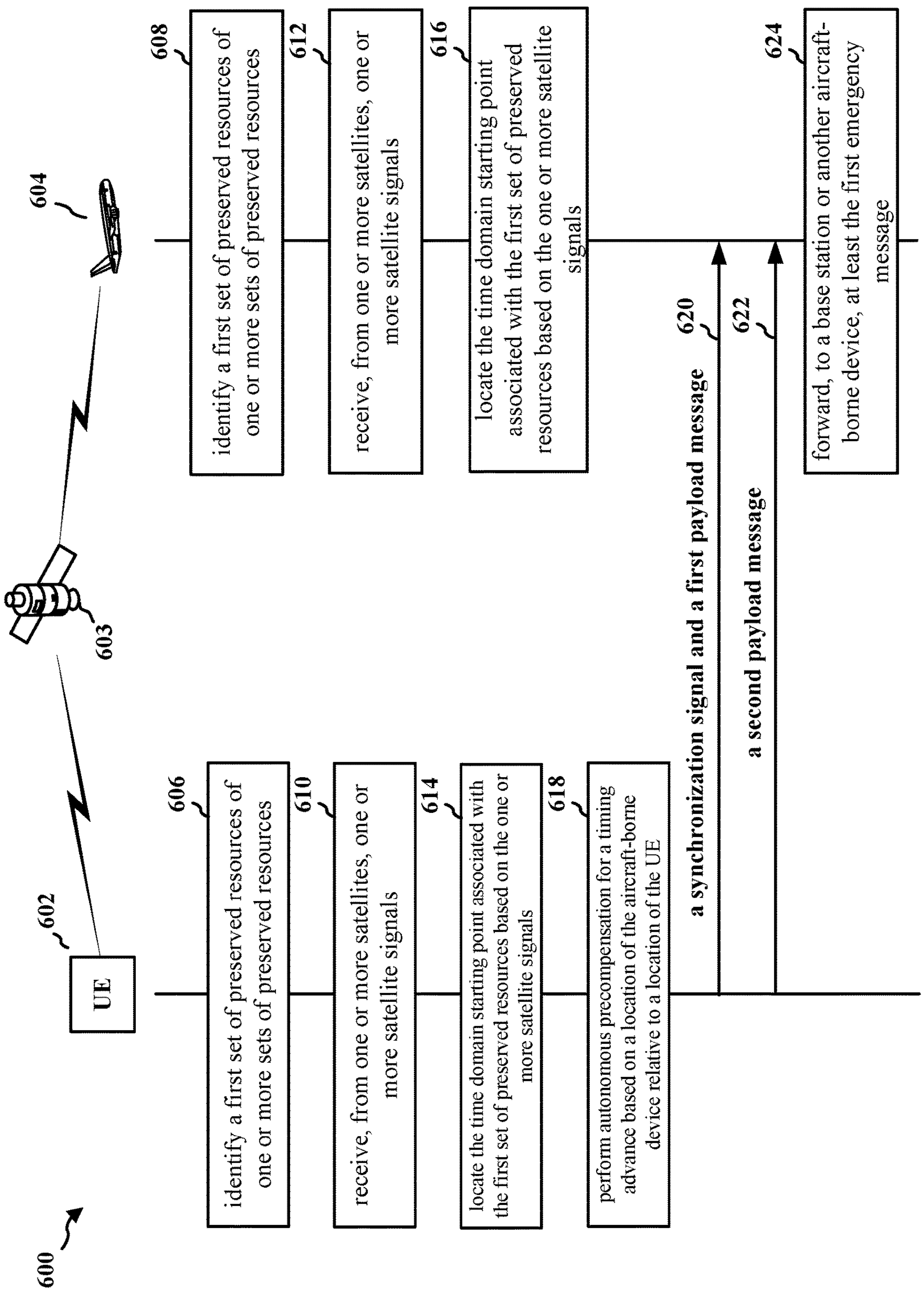
FIG. 6 is a diagram of a communication flow of a method of wireless communication.

FIG. 6 is a diagram of a communication flow 600 of a method of wireless communication. The UE 602 may correspond to the UE 104/350. The aircraft-borne device 604 may correspond to the aircraft-borne device 103. At 606, the UE 602 may identify a first set of preserved resources of one or more sets of preserved resources. At 608, the aircraft-borne device 604 may identify a first set of preserved resources of one or more sets of preserved resources. The first set of preserved resources may be associated with a time domain starting point, a time domain duration, and a frequency domain resource allocation. At 610, the UE 602 may receive, from one or more satellites 603, one or more satellite signals. At 612, the aircraft-borne device 604 may receive, from one or more satellites 603, one or more satellite signals. At 614, the UE 602 may locate the time domain starting point associated with the first set of preserved resources based on the one or more satellite signals. At 616, the aircraft-borne device 604 may locate the time domain starting point associated with the first set of preserved resources based on the one or more satellite signals. At 618, the UE 602 may perform autonomous pre-compensation for a timing advance based on a location of the aircraft-borne device 604 relative to a location of the UE 602.

At 620, the UE 602 may transmit, to an aircraft-borne device 604 and the aircraft-borne device 604 may receive, from the UE 602, over at least part of the first set of preserved resources, a synchronization signal and a first payload message. The first payload message may include a first emergency message and may be transmitted and received via one of a first PUSCH, a first PSSCH, or a PSCCH. The synchronization signal may include a preamble or a DM-RS. At least one of the synchronization signal or the first payload message may be repeated one or more times based at least in part on a transmission capability associated with the UE 602. The synchronization signal may be first transmitted to the aircraft-borne device 604 by the UE 602 after a prespecified time offset has passed since the time domain starting point associated with the first set of preserved resources. The one of the first PUSCH, the first PSSCH, or the PSCCH may be associated with at least one of a prespecified first MCS, a prespecified first payload size, or a prespecified first resource allocation. The first payload message may include an indication of at least one of a second MCS, a second payload size, or a second resource allocation associated with the one of a second PUSCH or a second PSSCH.

At 622, the UE 602 may transmit, to the aircraft-borne device 604 and the aircraft-borne device 604 may receive, from the UE 602, over at least part of the first set of preserved resources, a second payload message via one of a second PUSCH or a second PSSCH. The second payload message may include a second emergency message. The first set of preserved resources may be associated with a time domain duration that is at least as long as a sum of a prespecified time offset, a propagation delay, and a total transmission duration associated with the synchronization signal, the first payload message, and the second payload message. At 624, the aircraft-borne device 604 may forward, to a base station or another aircraft-borne device, at least the first emergency message. The first emergency message may be associated with a priority. The first emergency message may include at least one of longitude and latitude coordinates, a time stamp, an identifier of the UE, a personal identifier, an emergency type, or an emergency level. If a second emergency message is received at 622, the aircraft-borne device 604 may further forward, to a base station or another aircraft-borne device, the second emergency message. The complete emergency message may correspond to a combination of the first emergency message and the second emergency message.

Figure 7:
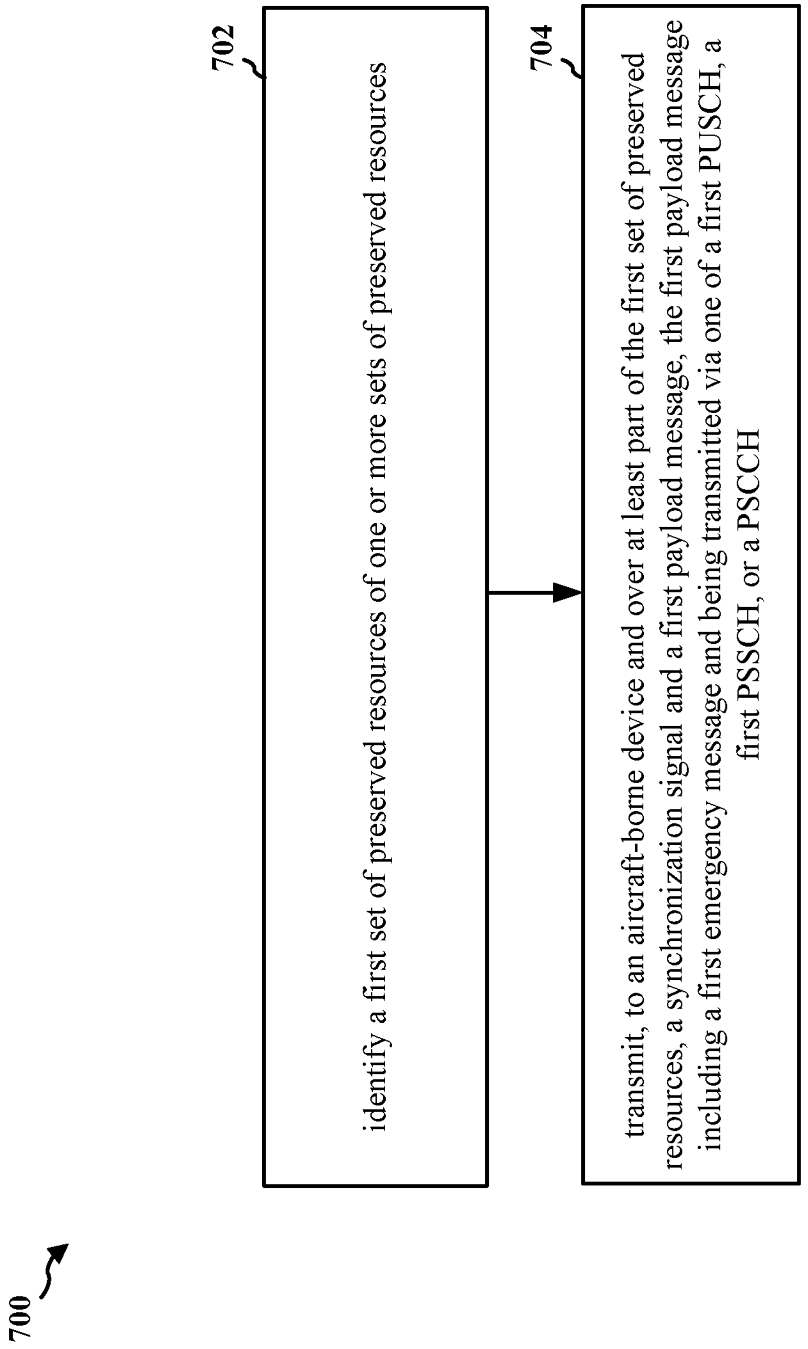
FIG. 7 is a flowchart of a method of wireless communication.

FIG. 7 is a flowchart 700 of a method of wireless communication. The method may be performed by a UE (e.g., the UE 104/350/602; the apparatus 1102). At 702, the UE may identify a first set of preserved resources of one or more sets of preserved resources. For example, 702 may be performed by the ATG relay component 1140 in FIG. 11. Referring to FIG. 6, at 606, the UE 602 may identify a first set of preserved resources of one or more sets of preserved resources.

At 704, the UE may transmit, to an aircraft-borne device and over at least part of the first set of preserved resources, a synchronization signal and a first payload message. The first payload message may include a first emergency message and may be transmitted via one of a first PUSCH, a first PSSCH, or a PSCCH. For example, 704 may be performed by the ATG relay component 1140 in FIG. 11. Referring to FIG. 6, at 620, the UE 602 may transmit, to an aircraft-borne device 604 and over at least part of the first set of preserved resources, a synchronization signal and a first payload message.

Figure 8:
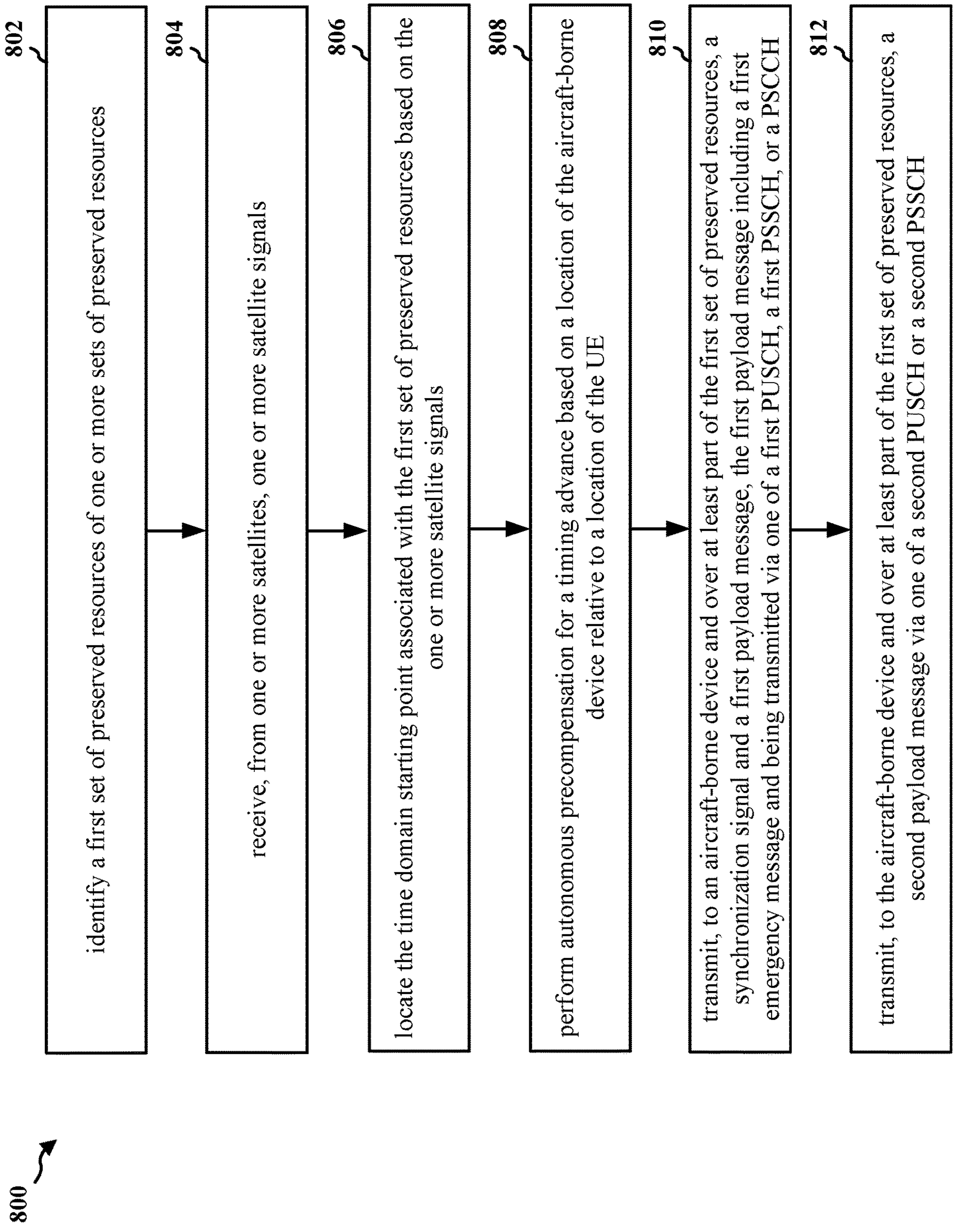
FIG. 8 is a flowchart of a method of wireless communication.

FIG. 8 is a flowchart 800 of a method of wireless communication. The method may be performed by a UE (e.g., the UE 104/350/602; the apparatus 1102). At 802, the UE may identify a first set of preserved resources of one or more sets of preserved resources. For example, 802 may be performed by the ATG relay component 1140 in FIG. 11. Referring to FIG. 6, at 606, the UE 602 may identify a first set of preserved resources of one or more sets of preserved resources.

At 810, the UE may transmit, to an aircraft-borne device and over at least part of the first set of preserved resources, a synchronization signal and a first payload message. The first payload message may include a first emergency message and may be transmitted via one of a first PUSCH, a first PSSCH, or a PSCCH. For example, 810 may be performed by the ATG relay component 1140 in FIG. 11. Referring to FIG. 6, at 620, the UE 602 may transmit, to an aircraft-borne device 604 and over at least part of the first set of preserved resources, a synchronization signal and a first payload message.

In one configuration, the synchronization signal may include a preamble or a DM-RS.

In one configuration, at least one of the synchronization signal or the first payload message may be repeated one or more times based at least in part on a transmission capability associated with the UE.

In one configuration, the first set of preserved resources may be associated with a time domain starting point, a time domain duration, and a frequency domain resource allocation.

In one configuration, at 804, the UE may receive, from one or more satellites, one or more satellite signals. For example, 804 may be performed by the ATG relay component 1140 in FIG. 11. Referring to FIG. 6, at 610, the UE 602 may receive, from one or more satellites 603, one or more satellite signals. At 806, the UE may locate the time domain starting point associated with the first set of preserved resources based on the one or more satellite signals. For example, 806 may be performed by the ATG relay component 1140 in FIG. 11. Referring to FIG. 6, at 614, the UE 602 may locate the time domain starting point associated with the first set of preserved resources based on the one or more satellite signals.

In one configuration, referring to FIG. 6, the synchronization signal may be first transmitted to the aircraft-borne device 604 after a prespecified time offset has passed since the time domain starting point associated with the first set of preserved resources.

In one configuration, the one of the first PUSCH, the first PSSCH, or the PSCCH may be associated with at least one of a prespecified first MCS, a prespecified first payload size, or a prespecified first resource allocation.

In one configuration, at 812, the UE may transmit, to the aircraft-borne device and over at least part of the first set of preserved resources, a second payload message via one of a second PUSCH or a second PSSCH. For example, 812 may be performed by the ATG relay component 1140 in FIG. 11. Referring to FIG. 6, at 622, the UE 602 may transmit, to the aircraft-borne device 604 and over at least part of the first set of preserved resources, a second payload message via one of a second PUSCH or a second PSSCH.

In one configuration, the first payload message may include an indication of at least one of a second MCS, a second payload size, or a second resource allocation associated with the one of the second PUSCH or the second PSSCH.

In one configuration, the first set of preserved resources may be associated with a time domain duration that is at least as long as a sum of a prespecified time offset, a propagation delay, and a total transmission duration associated with the synchronization signal, the first payload message, and the second payload message.

In one configuration, the second payload message may include a second emergency message.

In one configuration, the first emergency message may be associated with a priority.

In one configuration, at 808, the UE may perform autonomous pre-compensation for a timing advance based on a location of the aircraft-borne device relative to a location of the UE. For example, 808 may be performed by the ATG relay component 1140 in FIG. 11. Referring to FIG. 6, at 618, the UE 602 may perform autonomous pre-compensation for a timing advance based on a location of the aircraft-borne device 604 relative to a location of the UE 602.

In one configuration, referring to FIG. 6, the first emergency message may include at least one of longitude and latitude coordinates, a time stamp, an identifier of the UE 602, a personal identifier, an emergency type, or an emergency level.

Figure 9:
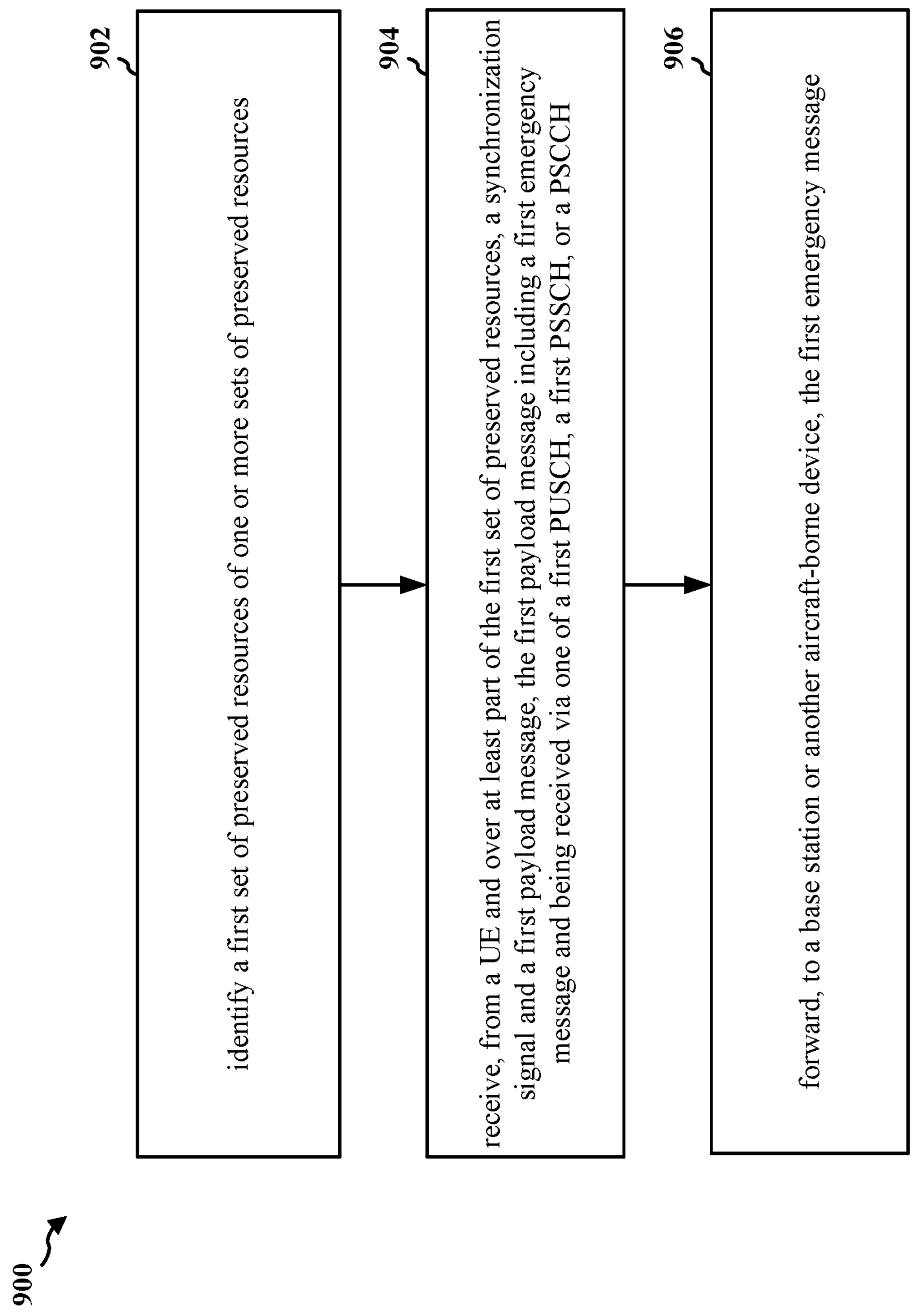
FIG. 9 is a flowchart of a method of wireless communication.

FIG. 9 is a flowchart 900 of a method of wireless communication. The method may be performed by an aircraft-borne device (e.g., the aircraft-borne device 103/604; the apparatus 1202). At 902, the aircraft-borne device may identify a first set of preserved resources of one or more sets of preserved resources. For example, 902 may be performed by the ATG relay component 1240 in FIG. 12. Referring to FIG. 6, at 608, the aircraft-borne device 604 may identify a first set of preserved resources of one or more sets of preserved resources.

At 904, the aircraft-borne device may receive, from a UE and over at least part of the first set of preserved resources, a synchronization signal and a first payload message. The first payload message may include a first emergency message and may be received via one of a first PUSCH, a first PSSCH, or a PSCCH. For example, 904 may be performed by the ATG relay component 1240 in FIG. 12. Referring to FIG. 6, at 620, the aircraft-borne device 604 may receive, from a UE 602 and over at least part of the first set of preserved resources, a synchronization signal and a first payload message.

At 906, the aircraft-borne device may forward, to a base station or another aircraft-borne device, at least the first emergency message. For example, 906 may be performed by the ATG relay component 1240 in FIG. 12. Referring to FIG. 6, at 624, the aircraft-borne device 604 may forward, to a base station or another aircraft-borne device, at least the first emergency message.

FIG. 10 is a flowchart 1000 of a method of wireless communication. The method may be performed by an aircraft-borne device (e.g., the aircraft-borne device 103/604; the apparatus 1202). At 1002, the aircraft-borne device may identify a first set of preserved resources of one or more sets of preserved resources. For example, 1002 may be performed by the ATG relay component 1240 in FIG. 12. Referring to FIG. 6, at 608, the aircraft-borne device 604 may identify a first set of preserved resources of one or more sets of preserved resources.

At 1008, the aircraft-borne device may receive, from a UE and over at least part of the first set of preserved resources, a synchronization signal and a first payload message. The first payload message may include a first emergency message and may be received via one of a first PUSCH, a first PSSCH, or a PSCCH. For example, 1008 may be performed by the ATG relay component 1240 in FIG. 12. Referring to FIG. 6, at 620, the aircraft-borne device 604 may receive, from a UE 602 and over at least part of the first set of preserved resources, a synchronization signal and a first payload message.

At 1012, the aircraft-borne device may forward, to a base station or another aircraft-borne device, at least the first emergency message. For example, 1012 may be performed by the ATG relay component 1240 in FIG. 12. Referring to FIG. 6, at 624, the aircraft-borne device 604 may forward, to a base station or another aircraft-borne device, at least the first emergency message.

In one configuration, the synchronization signal may include a preamble or a DM-RS.

In one configuration, at least one of the synchronization signal or the first payload message may be associated with one or more repetitions.

In one configuration, the first set of preserved resources may be associated with a time domain starting point, a time domain duration, and a frequency domain resource allocation.

In one configuration, at 1004, the aircraft-borne device may receive, from one or more satellites, one or more satellite signals. For example, 1004 may be performed by the ATG relay component 1240 in FIG. 12. Referring to FIG. 6, at 612, the aircraft-borne device 604 may receive, from one or more satellites 603, one or more satellite signals. At 1006, the aircraft-borne device may locate the time domain starting point associated with the first set of preserved resources based on the one or more satellite signals. For example, 1006 may be performed by the ATG relay component 1240 in FIG. 12. Referring to FIG. 6, at 616, the aircraft-borne device 604 may locate the time domain starting point associated with the first set of preserved resources based on the one or more satellite signals.

In one configuration, the synchronization signal may be first received after a prespecified time offset and a propagation delay have passed since the time domain starting point associated with the first set of preserved resources.

In one configuration, the one of the first PUSCH, the first PSSCH, or the PSCCH may be associated with at least one of a prespecified first MCS, a prespecified first payload size, or a prespecified first resource allocation.

In one configuration, at 1010, the aircraft-borne device may receive, from the UE and over at least part of the first set of preserved resources, a second payload message via one of a second PUSCH or a second PSSCH. For example, 1010 may be performed by the ATG relay component 1240 in FIG. 12. Referring to FIG. 6, at 622, the aircraft-borne device 604 may receive, from the UE 602 and over at least part of the first set of preserved resources, a second payload message via one of a second PUSCH or a second PSSCH.

In one configuration, the first payload message may include an indication of at least one of a second MCS, a second payload size, or a second resource allocation associated with the one of the second PUSCH or the second PSSCH.

In one configuration, the first set of preserved resources may be associated with a time domain duration that is at least as long as a sum of a prespecified time offset, a propagation delay, and a total reception duration associated with the synchronization signal, the first payload message, and the second payload message.

In one configuration, the second payload message may include a second emergency message.

In one configuration, the first emergency message may be associated with a priority.

In one configuration, referring to FIG. 6, the first emergency message may include at least one of longitude and latitude coordinates, a time stamp, an identifier of the UE 602, a personal identifier, an emergency type, or an emergency level.

Figure 11:
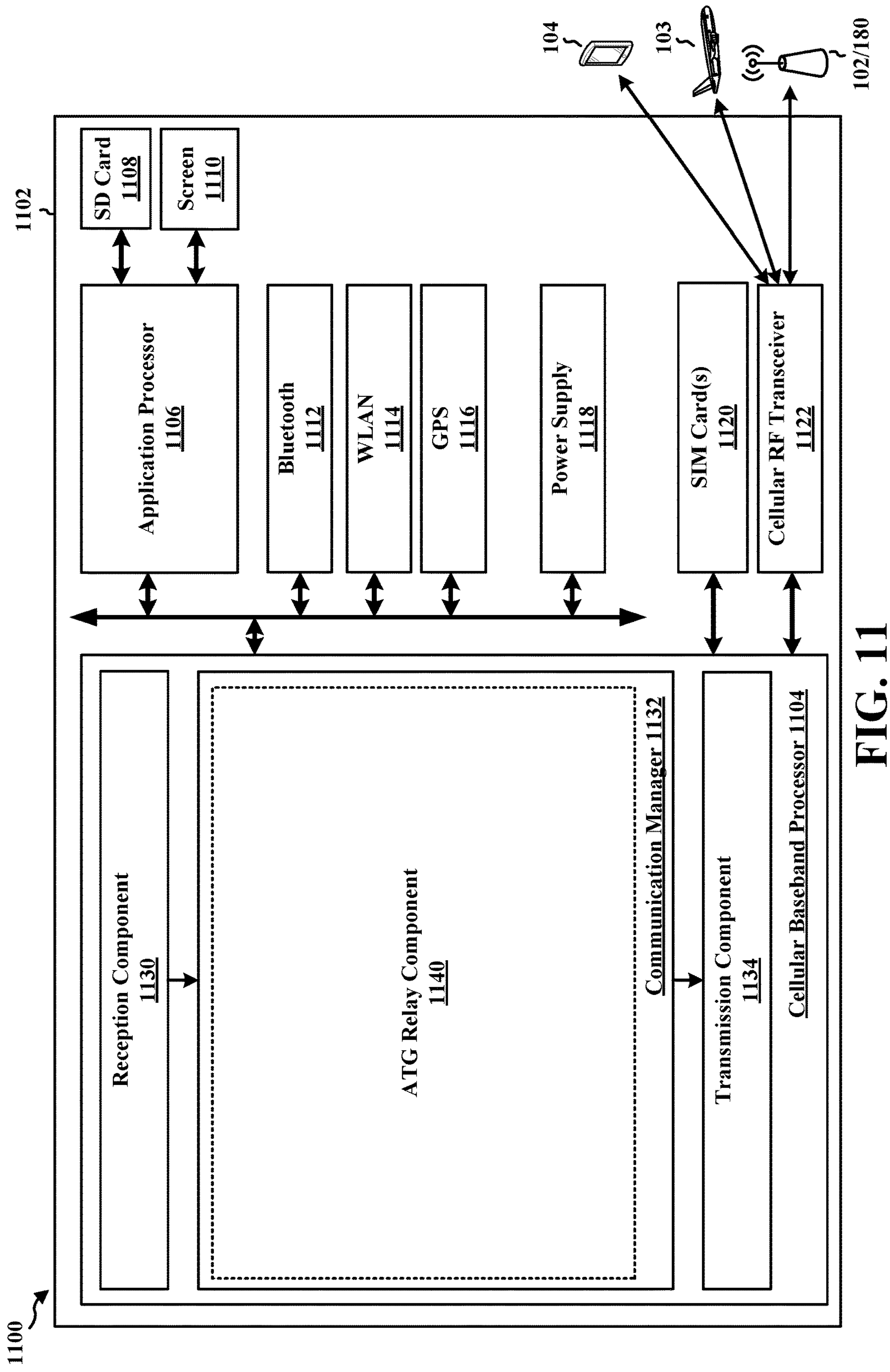
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104, BS 102/180, and/or an aircraft-borne device 103. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes an ATG relay component 1140 that may be configured to identify a first set of preserved resources of one or more sets of preserved resources, e.g., as described in connection with 702 in FIGS. 7 and 802 in FIG. 8. The ATG relay component 1140 may be configured to receive, from one or more satellites, one or more satellite signals, e.g., as described in connection with 804 in FIG. 8. The ATG relay component 1140 may be configured to locate the time domain starting point associated with the first set of preserved resources based on the one or more satellite signals, e.g., as described in connection with 806 in FIG. 8. The ATG relay component 1140 may be configured to perform autonomous pre-compensation for a timing advance based on a location of the aircraft-borne device relative to a location of the UE, e.g., as described in connection with 808 in FIG. 8. The ATG relay component 1140 may be configured to transmit, to an aircraft-borne device and over at least part of the first set of preserved resources, a synchronization signal and a first payload message, e.g., as described in connection with 704 in FIGS. 7 and 810 in FIG. 8. The ATG relay component 1140 may be configured to transmit, to the aircraft-borne device and over at least part of the first set of preserved resources, a second payload message via one of a second PUSCH or a second PSSCH, e.g., as described in connection with 812 in FIG. 8.

The apparatus may include additional components that perform each of the blocks of the algorithm in the flowcharts of FIGS. 6-8. As such, each block in the flowcharts of FIGS. 6-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for identifying a first set of preserved resources of one or more sets of preserved resources. The apparatus 1102, and in particular the cellular baseband processor 1104, further includes means for transmitting, to an aircraft-borne device and over at least part of the first set of preserved resources, a synchronization signal and a first payload message. The first payload message may include a first emergency message and may be transmitted via one of a first PUSCH, a first PSSCH, or a PSCCH.

In one configuration, the synchronization signal may include a preamble or a DM-RS. In one configuration, at least one of the synchronization signal or the first payload message may be repeated one or more times based at least in part on a transmission capability associated with the UE. In one configuration, the first set of preserved resources may be associated with a time domain starting point, a time domain duration, and a frequency domain resource allocation. In one configuration, the apparatus 1102, and in particular the cellular baseband processor 1104, further includes means for receiving, from one or more satellites, one or more satellite signals. The apparatus 1102, and in particular the cellular baseband processor 1104, further includes means for locating the time domain starting point associated with the first set of preserved resources based on the one or more satellite signals. In one configuration, the synchronization signal may be first transmitted to the aircraft-borne device after a prespecified time offset has passed since the time domain starting point associated with the first set of preserved resources. In one configuration, the one of the first PUSCH, the first PSSCH, or the PSCCH may be associated with at least one of a prespecified first MCS, a prespecified first payload size, or a prespecified first resource allocation. In one configuration, the apparatus 1102, and in particular the cellular baseband processor 1104, further includes means for transmitting, to the aircraft-borne device and over at least part of the first set of preserved resources, a second payload message via one of a second PUSCH or a second PSSCH. In one configuration, the first payload message may include an indication of at least one of a second MCS, a second payload size, or a second resource allocation associated with the one of the second PUSCH or the second PSSCH. In one configuration, the first set of preserved resources may be associated with a time domain duration that is at least as long as a sum of a prespecified time offset, a propagation delay, and a total transmission duration associated with the synchronization signal, the first payload message, and the second payload message. In one configuration, the second payload message may include a second emergency message. In one configuration, the first emergency message may be associated with a priority. In one configuration, the apparatus 1102, and in particular the cellular baseband processor 1104, further includes means for performing autonomous pre-compensation for a timing advance based on a location of the aircraft-borne device relative to a location of the UE. In one configuration, the first emergency message may include at least one of longitude and latitude coordinates, a time stamp, an identifier of the UE, a personal identifier, an emergency type, or an emergency level.

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
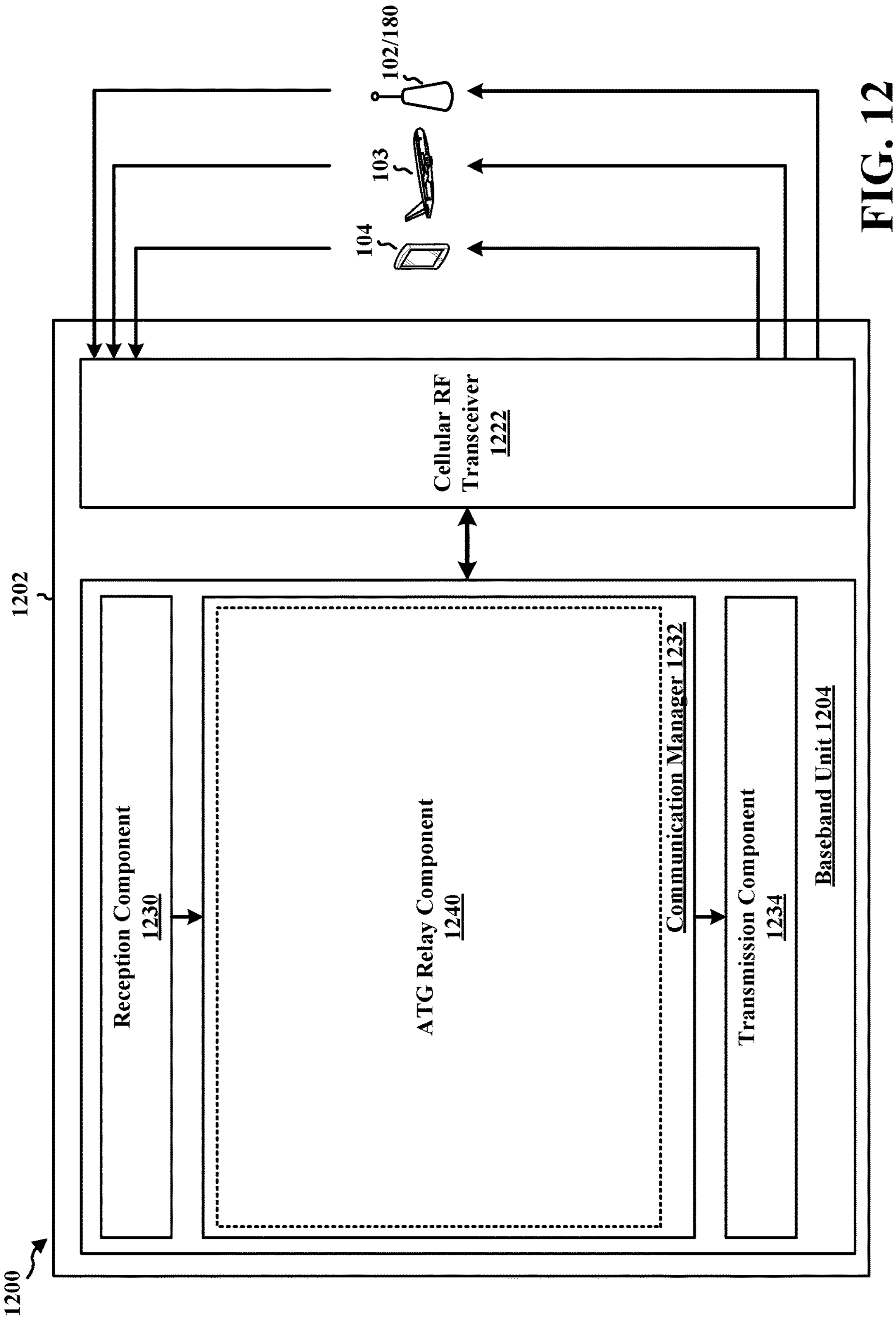
FIG. 12 is a diagram illustrating an example of a hardware implementation for an example apparatus.

FIG. 12 is a diagram 1200 illustrating an example of a hardware implementation for an apparatus 1202. The apparatus 1202 may be an aircraft-borne device, a component of an aircraft-borne device, or may implement aircraft-borne device functionality. In some aspects, the apparatus 1202 may include a baseband unit 1204. The baseband unit 1204 may communicate through a cellular RF transceiver 1222 with the UE 104, the base station 102/180, or another aircraft-borne device 103. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204.

The communication manager 1232 includes an ATG relay component 1240 that may be configured to identify a first set of preserved resources of one or more sets of preserved resources, e.g., as described in connection with 902 in FIGS. 9 and 1002 in FIG. 10. The ATG relay component 1240 may be configured to receive, from one or more satellites, one or more satellite signals, e.g., as described in connection with 1004 in FIG. 10. The ATG relay component 1240 may be configured to locate the time domain starting point associated with the first set of preserved resources based on the one or more satellite signals, e.g., as described in connection with 1006 in FIG. 10. The ATG relay component 1240 may be configured to receive, from a UE and over at least part of the first set of preserved resources, a synchronization signal and a first payload message, e.g., as described in connection with 904 in FIGS. 9 and 1008 in FIG. 10. The ATG relay component 1240 may be configured to receive, from the UE and over at least part of the first set of preserved resources, a second payload message via one of a second PUSCH or a second PSSCH, e.g., as described in connection with 1010 in FIG. 10. The ATG relay component 1240 may be configured to forward, to a base station or another aircraft-borne device, at least the first emergency message, e.g., as described in connection with 906 in FIGS. 9 and 1012 in FIG. 10.

The apparatus may include additional components that perform each of the blocks of the algorithm in the flowcharts of FIGS. 6, 9, and 10. As such, each block in the flowcharts of FIGS. 6, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for identifying a first set of preserved resources of one or more sets of preserved resources. The apparatus 1202, and in particular the baseband unit 1204, further includes means for receiving, from a UE and over at least part of the first set of preserved resources, a synchronization signal and a first payload message. The first payload message may include a first emergency message and may be received via one of a first PUSCH, a first PSSCH, or a PSCCH. The apparatus 1202, and in particular the baseband unit 1204, further includes means for forwarding, to a base station or another aircraft-borne device, at least the first emergency message.

In one configuration, the synchronization signal may include a preamble or a DM-RS. In one configuration, at least one of the synchronization signal or the first payload message may be associated with one or more repetitions. In one configuration, the first set of preserved resources may be associated with a time domain starting point, a time domain duration, and a frequency domain resource allocation. In one configuration, the apparatus 1202, and in particular the baseband unit 1204, further includes means for receiving, from one or more satellites, one or more satellite signals. The apparatus 1202, and in particular the baseband unit 1204, further includes means for locating the time domain starting point associated with the first set of preserved resources based on the one or more satellite signals. In one configuration, the synchronization signal may be first received after a prespecified time offset and a propagation delay have passed since the time domain starting point associated with the first set of preserved resources. In one configuration, the one of the first PUSCH, the first PSSCH, or the PSCCH may be associated with at least one of a prespecified first MCS, a prespecified first payload size, or a prespecified first resource allocation. In one configuration, the apparatus 1202, and in particular the baseband unit 1204, further includes means for receiving, from the UE and over at least part of the first set of preserved resources, a second payload message via one of a second PUSCH or a second PSSCH. In one configuration, the first payload message may include an indication of at least one of a second MCS, a second payload size, or a second resource allocation associated with the one of the second PUSCH or the second PSSCH. In one configuration, the first set of preserved resources may be associated with a time domain duration that is at least as long as a sum of a prespecified time offset, a propagation delay, and a total reception duration associated with the synchronization signal, the first payload message, and the second payload message. In one configuration, the second payload message may include a second emergency message. In one configuration, the first emergency message may be associated with a priority. In one configuration, the first emergency message may include at least one of longitude and latitude coordinates, a time stamp, an identifier of the UE, a personal identifier, an emergency type, or an emergency level.

The means may be one or more of the components of the apparatus 1202 configured to perform the functions recited by the means.

Referring back to FIGS. 4A-10, a UE may identify a first set of preserved resources of one or more sets of preserved resources. An aircraft-borne device may identify a first set of preserved resources of one or more sets of preserved resources. The UE may transmit, to an aircraft-borne device and the aircraft-borne device may, receive from the UE, over at least part of the first set of preserved resources, a synchronization signal and a first payload message. The first payload message may include a first emergency message and may be transmitted and received via one of a first PUSCH, a first PSSCH, or a PSCCH. The aircraft-borne device may forward, to a base station or another aircraft-borne device, at least the first emergency message. Accordingly, a UE located in an area without terrestrial cellular coverage may transmit an emergency message to an aircraft-borne device over a set of preserved resources. The aircraft-borne device may then forward the emergency message to a ground-based base station or another aircraft-borne device. With the use of the preserved resources, the aircraft-borne device may not broadcast a signal to tenable to the UE to discover the aircraft-borne device, and may generate no interference to terrestrial systems.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to identify a first set of preserved resources of one or more sets of preserved resources; and transmit, to an aircraft-borne device and over at least part of the first set of preserved resources, a synchronization signal and a first payload message, the first payload message including a first emergency message and being transmitted via one of a first PUSCH, a first PSSCH, or a PSCCH.

Aspect 2 is the apparatus of aspect 1, where the synchronization signal includes a preamble or a DM-RS.

Aspect 3 is the apparatus of any of aspects 1 and 2, where at least one of the synchronization signal or the first payload message is repeated one or more times based at least in part on a transmission capability associated with the UE.

Aspect 4 is the apparatus of any of aspects 1 to 3, where the first set of preserved resources is associated with a time domain starting point, a time domain duration, and a frequency domain resource allocation.

Aspect 5 is the apparatus of aspect 4, the at least one processor being further configured to: receive, from one or more satellites, one or more satellite signals; and locate the time domain starting point associated with the first set of preserved resources based on the one or more satellite signals.

Aspect 6 is the apparatus of aspect 5, where the synchronization signal is first transmitted to the aircraft-borne device after a prespecified time offset has passed since the time domain starting point associated with the first set of preserved resources.

Aspect 7 is the apparatus of any of aspects 1 to 6, where the one of the first PUSCH, the first PSSCH, or the PSCCH is associated with at least one of a prespecified first MCS, a prespecified first payload size, or a prespecified first resource allocation.

Aspect 8 is the apparatus of any of aspects 1 to 7, the at least one processor being further configured to: transmit, to the aircraft-borne device and over at least part of the first set of preserved resources, a second payload message via one of a second PUSCH or a second PSSCH.

Aspect 9 is the apparatus of aspect 8, where the first payload message includes an indication of at least one of a second MCS, a second payload size, or a second resource allocation associated with the one of the second PUSCH or the second PSSCH.

Aspect 10 is the apparatus of any of aspects 8 and 9, where the first set of preserved resources is associated with a time domain duration that is at least as long as a sum of a prespecified time offset, a propagation delay, and a total transmission duration associated with the synchronization signal, the first payload message, and the second payload message.

Aspect 11 is the apparatus of any of aspects 8 to 10, where the second payload message includes a second emergency message.

Aspect 12 is the apparatus of any of aspects 1 to 11, where the first emergency message is associated with a priority.

Aspect 13 is the apparatus of any of aspects 1 to 12, the at least one processor being further configured to: perform autonomous pre-compensation for a timing advance based on a location of the aircraft-borne device relative to a location of the UE.

Aspect 14 is the apparatus of any of aspects 1 to 13, where the first emergency message includes at least one of longitude and latitude coordinates, a time stamp, an identifier of the UE, a personal identifier, an emergency type, or an emergency level.

Aspect 15 is the apparatus of any of aspects 1 to 14, further including a transceiver coupled to the at least one processor.

Aspect 16 is an apparatus for wireless communication at an aircraft-borne device including at least one processor coupled to a memory and configured to identify a first set of preserved resources of one or more sets of preserved resources; receive, from a UE and over at least part of the first set of preserved resources, a synchronization signal and a first payload message, the first payload message including a first emergency message and being received via one of a first PUSCH, a first PSSCH, or a PSCCH; and forward, to a base station or another aircraft-borne device, at least the first emergency message.

Aspect 17 is the apparatus of aspect 16, where the synchronization signal includes a preamble or a DM-RS.

Aspect 18 is the apparatus of any of aspects 16 and 17, where at least one of the synchronization signal or the first payload message is associated with one or more repetitions.

Aspect 19 is the apparatus of any of aspects 16 to 18, where the first set of preserved resources is associated with a time domain starting point, a time domain duration, and a frequency domain resource allocation.

Aspect 20 is the apparatus of aspect 19, the at least one processor being further configured to: receive, from one or more satellites, one or more satellite signals; and locate the time domain starting point associated with the first set of preserved resources based on the one or more satellite signals.

Aspect 21 is the apparatus of aspect 20, where the synchronization signal is first received after a prespecified time offset and a propagation delay have passed since the time domain starting point associated with the first set of preserved resources.

Aspect 22 is the apparatus of any of aspects 16 to 21, where the one of the first PUSCH, the first PSSCH, or the PSCCH is associated with at least one of a prespecified first MCS, a prespecified first payload size, or a prespecified first resource allocation.

Aspect 23 is the apparatus of any of aspects 16 to 22, the at least one processor being further configured to: receive, from the UE and over at least part of the first set of preserved resources, a second payload message via one of a second PUSCH or a second PSSCH.

Aspect 24 is the apparatus of aspect 23, where the first payload message includes an indication of at least one of a second MCS, a second payload size, or a second resource allocation associated with the one of the second PUSCH or the second PSSCH.

Aspect 25 is the apparatus of any of aspects 23 and 24, where the first set of preserved resources is associated with a time domain duration that is at least as long as a sum of a prespecified time offset, a propagation delay, and a total reception duration associated with the synchronization signal, the first payload message, and the second payload message.

Aspect 26 is the apparatus of any of aspects 23 to 25, where the second payload message includes a second emergency message.

Aspect 27 is the apparatus of any of aspects 16 to 26, where the first emergency message is associated with a priority.

Aspect 28 is the apparatus of any of aspects 16 to 27, where the first emergency message includes at least one of longitude and latitude coordinates, a time stamp, an identifier of the UE, a personal identifier, an emergency type, or an emergency level.

Aspect 29 is the apparatus of any of aspects 16 to 28, further including a transceiver coupled to the at least one processor.

Aspect 30 is a method of wireless communication for implementing any of aspects 1 to 29.

Aspect 31 is an apparatus for wireless communication including means for implementing any of aspects 1 to 29.

Aspect 32 is a computer-readable medium storing computer executable code, where the code when executed by a processor causes the processor to implement any of aspects 1 to 29.

What is claimed is:

1. An apparatus for wireless communication at a user equipment (UE), comprising:

memory; and at least one processor coupled to the memory and configured to:

identify a first set of preserved resources of one or more sets of preserved resources, wherein the first set of preserved resources comprises one of a first physical uplink shared channel (PUSCH), a first physical sidelink shared channel (PSSCH), or a physical sidelink control channel (PSCCH) associated with a time domain starting point and a time domain duration; and transmit, to an aircraft-borne device and over at least part of the first set of preserved resources, a signal based on the time domain starting point and the time domain duration, wherein the signal comprises a synchronization signal and a first payload, wherein the first payload comprises a first emergency message.

2. The apparatus of claim 1, wherein the synchronization signal comprises a preamble or a demodulation reference signal (DM-RS) associated with the first payload.

3. The apparatus of claim 1, wherein, to transmit the signal, the at least one processor is configured to:

repeatedly transmit at least one of the synchronization signal or the first payload one or more times based at least in part on a transmission capability associated with the UE.

4. The apparatus of claim 1, wherein the first set of preserved resources is further associated with a frequency domain resource allocation, wherein, to transmit the signal, the at least one processor is configured to:

transmit the signal further based on the frequency domain resource allocation.

5. The apparatus of claim 4, wherein the at least one processor is further configured to:

receive, from one or more satellites, one or more satellite signals; and locate the time domain starting point associated with the first set of preserved resources based on the one or more satellite signals.

6. The apparatus of claim 5, wherein, to transmit the signal, the at least one processor is configured to:

transmit the synchronization signal to the aircraft-borne device after a prespecified time offset has passed since the time domain starting point associated with the first set of preserved resources.

7. The apparatus of claim 1, wherein the first payload is associated with at least one of a prespecified first modulation and coding scheme (MCS), a prespecified first payload size, or a prespecified first resource allocation, wherein, to transmit the signal, the at least one processor is configured to:

transmit the first payload based on the at least one of the prespecified first MCS, the prespecified first payload size, or the prespecified first resource allocation.

8. The apparatus of claim 7, wherein the signal comprises a second payload.

9. The apparatus of claim 8, wherein the first payload includes an indication of at least one of a second MCS, a second payload size, or a second resource allocation, wherein, to transmit the signal, the at least one processor is configured to:

transmit the first payload based on the at least one of the prespecified first MCS, the prespecified first payload size, or the prespecified first resource allocation; and transmit the second payload based on the at least one of the second MCS, the second payload size, or the second resource allocation.

10. The apparatus of claim 8, wherein the time domain duration is greater or equal to a sum of a prespecified time offset, a propagation delay, and a total transmission duration associated with the signal comprising the synchronization signal, the first payload, and the second payload.

11. The apparatus of claim 8, wherein the second payload includes a second emergency message.

12. The apparatus of claim 1, wherein the first emergency message is associated with a priority.

13. The apparatus of claim 1, wherein, to transmit the signal, the at least one processor is configured to:

determine a location of the aircraft-borne device relative to a location of the UE;

perform autonomous pre-compensation for a timing advance based on the determined location of the aircraft-borne device relative to the location of the UE; and transmit the signal based on the performed autonomous pre-compensation of the timing advance.

14. The apparatus of claim 1, further comprising a transceiver coupled to the at least one processor, wherein the first emergency message comprises at least one of:

longitude and latitude coordinates;

a time stamp;

an identifier of the UE;

a personal identifier;

an emergency type;

an emergency level; or a combination thereof.

15. A method of wireless communication at a user equipment (UE), comprising:

identifying a first set of preserved resources of one or more sets of preserved resources, wherein the first set of preserved resources comprises one of a first physical uplink shared channel (PUSCH), a first physical sidelink shared channel (PSSCH), or a physical sidelink control channel (PSCCH) associated with a time domain starting point and a time domain duration; and transmitting, to an aircraft-borne device and over at least part of the first set of preserved resources, a signal based on the time domain starting point and the time domain duration, wherein the signal comprises a synchronization signal and a first payload, wherein the first payload comprises a first emergency message.

16. An apparatus for wireless communication at an aircraft-borne device, comprising:

memory; and at least one processor coupled to the memory and configured to:

identify a first set of preserved resources of one or more sets of preserved resources, wherein the first set of preserved resources comprises one of a first physical uplink shared channel (PUSCH), a first physical sidelink shared channel (PSSCH), or a physical sidelink control channel (PSCCH) associated with a time domain starting point and a time domain duration;

receive, from a user equipment (UE) and over at least part of the first set of preserved resources, a signal based on the time domain starting point and the time domain duration, wherein the signal comprises a synchronization signal and a first payload, wherein the first payload comprises a first emergency message; and forward, to a base station or another aircraft-borne device, at least the first emergency message.

17. The apparatus of claim 16, wherein the synchronization signal comprises a preamble or a demodulation reference signal (DM-RS) associated with the first payload.

18. The apparatus of claim 16, wherein, to receive the signal, the at least one processor is configured to:

repeatedly receive at least one of the synchronization signal or the first payload.

19. The apparatus of claim 16, wherein the first set of preserved resources is further associated with a frequency domain resource allocation, wherein to receive the signal, the at least one processor is configured to:

receive the signal further based on the frequency domain resource allocation.

20. The apparatus of claim 19, wherein the at least one processor is further configured to:

receive, from one or more satellites, one or more satellite signals; and locate the time domain starting point associated with the first set of preserved resources based on the one or more satellite signals.

21. The apparatus of claim 20, wherein, to receive the signal, the at least one processor is configured to:

receive the synchronization signal after a prespecified time offset and a propagation delay have passed since the time domain starting point associated with the first set of preserved resources.

22. The apparatus of claim 16, wherein the first payload is associated with at least one of a prespecified first modulation and coding scheme (MCS), a prespecified first payload size, or a prespecified first resource allocation, wherein, to receive the signal, the at least one processor is configured to:

receive the first payload based on the at least one of the prespecified first MCS, the prespecified first payload size, or the prespecified first resource allocation.

23. The apparatus of claim 22, wherein the signal comprises a second payload.

24. The apparatus of claim 23, wherein the first payload includes an indication of at least one of a second MCS, a second payload size, or a second resource allocation, wherein, to receive the signal, the at least one processor is configured to:

receive the first payload based on the at least one of the prespecified first MCS, the prespecified first payload size, or the prespecified first resource allocation; and receive the second payload based on the at least one of the second MCS, the second payload size, or the second resource allocation.

25. The apparatus of claim 23, wherein the time domain duration is greater or equal to a sum of a prespecified time offset, a propagation delay, and a total reception duration associated with the signal comprising the synchronization signal, the first payload, and the second payload.

26. The apparatus of claim 23, wherein the second payload includes a second emergency message.

27. The apparatus of claim 16, wherein the first emergency message is associated with a priority.

28. The apparatus of claim 16, wherein the first emergency message comprises at least one of:

longitude and latitude coordinates;

a time stamp;

an identifier of the UE;

a personal identifier;

an emergency type;

an emergency level; or a combination thereof.

29. The apparatus of claim 16, further comprising a transceiver coupled to the at least one processor, wherein, to receive the signal, the at least one processor is configured to:

receive the signal via the transceiver.

30. A method of wireless communication at an aircraft-borne device, comprising:

identifying a first set of preserved resources of one or more sets of preserved resources, wherein the first set of preserved resources comprises one of a first physical uplink shared channel (PUSCH), a first physical sidelink shared channel (PSSCH), or a physical sidelink control channel (PSCCH) associated with a time domain starting point and a time domain duration;

receiving, from a user equipment (UE) and over at least part of the first set of preserved resources, a signal based on the time domain starting point and the time domain duration, wherein the signal comprises a synchronization signal and a first payload, wherein the first payload comprises a first emergency message; and forwarding, to a base station or another aircraft-borne device, the first emergency message.

* * * * *